United States Patent
Wang et al.

(10) Patent No.: US 7,269,296 B2
(45) Date of Patent: Sep. 11, 2007

(54) METHOD AND APPARATUS FOR SHOOT SUPPRESSION IN IMAGE DETAIL ENHANCEMENT

(75) Inventors: Xianglin Wang, Santa Ana, CA (US); Yeong-Taeg Kim, Irvine, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 817 days.

(21) Appl. No.: 10/345,554

(22) Filed: Jan. 16, 2003

(65) Prior Publication Data

US 2003/0113032 A1    Jun. 19, 2003

(51) Int. Cl.
*G06K 9/40*    (2006.01)
(52) U.S. Cl. ..................... 382/275; 348/627
(58) Field of Classification Search .............. 382/300, 382/275; 348/627
See application file for complete search history.

(56) References Cited

U.S. PATENT DOCUMENTS

| | | | |
|---|---|---|---|
| 4,030,121 A | | 6/1977 | Faroudja |
| 5,038,388 A | * | 8/1991 | Song ........................... 382/266 |
| 5,479,215 A | * | 12/1995 | Chmielewski et al. ....... 348/627 |
| 5,880,767 A | * | 3/1999 | Liu .............................. 347/251 |
| 5,940,536 A | * | 8/1999 | Wake et al. ................. 382/205 |
| 6,987,542 B2 | * | 1/2006 | Nieuwenhuizen ........... 348/607 |
| 7,050,649 B2 | * | 5/2006 | Slavin ......................... 382/275 |
| 2002/0067862 A1 | | 6/2002 | Kim |
| 2003/0048367 A1 | * | 3/2003 | Rieder et al. ................ 348/252 |

OTHER PUBLICATIONS

Kok, C.W.; Nguyen, T.Q., "Non-negative sealing functions and applications in image coding", Signals, Systems and Computers, 1995. 1995 Conference Record of the Twenty-Ninth Asilomar Conference on, vol. 1, 30 Oct. 1, Nov. 1995; pp. 249-253 vol. 1.

* cited by examiner

*Primary Examiner*—Matthew C. Bella
*Assistant Examiner*—Dennis Rosario
(74) *Attorney, Agent, or Firm*—Kenneth L. Sherman; Michael Zarrabian; Myers Dawes Andras & Sherman, LLP

(57) ABSTRACT

A general shoot suppression method and system for image detail enhancement that provides good suppression in shoot areas while preserving the enhancement (with less or no suppression) in non-shoot areas. Asymmetry checker checks the luminance variation of pixels around the current pixel within a filtering range. Based on the checking result, different patterns of luminance variation in the neighborhood of the current pixel are categorized. Higher suppression is applied to those patterns that are more likely to cause overshoot/undershoot. Optionally, suppression is further associated with the intensity of detail signal at each pixel position. An intensity checker checks the magnitude of the detail signal. If the detail signal is weak at a current pixel position, it is unlikely that obvious shoot artifacts appear at that position, and little or no suppression is applied. Such a method and system provide shoot suppression only in shoot areas while maintaining good enhancement in non-shoot areas.

15 Claims, 13 Drawing Sheets shoot areas

METHOD AND APPARATUS FOR SHOOT SUPPRESSION IN IMAGE DETAIL ENHANCEMENT

FIELD OF THE INVENTION

The present invention relates to image detail enhancement, and in particular, to suppressing overshoot/undershoot in image detail enhancement.

BACKGROUND OF THE INVENTION

Shoot suppression is important in image detail enhancement process in order to reduce undesirable artifacts introduced into the enhanced image. FIG. 1 shows a system block diagram for a conventional image detail enhancement system 10 without shoot suppression. Such a system is typically known as "unsharp" filter, wherein an input signal f (representing at least a portion of a video image formed by pixels), is processed and output as a signal g. The signal f is provided to a low pass filter (LPF) 12 to generate a low-passed signal $f_1$. Then the difference between the signals f and $f_1$ is determined in a difference junction/node 14, as a detail (difference) signal, $(f-f_1)$. The detail signal is then multiplied by a constant K (K>1) for enhancement in a multiplication junction/node 16, and summed with the signal $f_1$ in a summing junction/node 18, to generate the output signal g. As such, the relationship between the output signal g and the input signal f can be expressed in the following equation:

$$g=(f-f_1)*K+f_1 \qquad (1)$$

Equation (1) can also be expressed as:

$$g=(f-f_1)*(K-1)+f \qquad (2)$$

Therefore, an equivalent form of the system block diagram can be as shown in FIG. 2. In equation (2), the product $(f-f_1)*(K-1)$ is the detail enhancement term. Therefore, the details come from the detail signal $(f-f_1)$. Wherever there is a non-zero difference between the signals f and $f_1$ there are details which may be enhanced in the detail enhancement process.

However, in an actual image, not all the areas with a difference between the signals f and $f_1$ are desirable for enhancement. An example is shown in FIGS. 3a-b, wherein FIG. 3a is the original image and FIG. 3b is the detail-enhanced image without overshoot/undershoot suppression. As can be seen, undesirable artifacts are introduced around edge areas in the enhanced image in FIG. 3b. This is known as overshoot/undershoot, and the arrows in FIG. 3b indicate some of the "shoot areas".

In order to remove such undesirable artifacts from detail-enhanced images, a shoot suppression mechanism is necessary. The system block diagram in FIG. 4 shows an example of such a mechanism. The system includes a shoot suppression block 15, wherein the output of the shoot suppression block 15 is a shoot suppression factor s, wherein $0 \leq s \leq 1$. The lower the value of s, the higher the suppression provided. The suppression factor is applied to the detail signal $(f-f_1)$, forming a detail enhancement term, and the result is combined with the input signal f to generate the detail-enhanced output signal g. The relationship between the output signal g and the input signal f in FIG. 4 can be expressed as:

$$g=(f-f_1)*(K-1)*s+f \qquad (3)$$

Several methods and systems exist that attempt to suppress the undesirable shoot artifacts. However, many such shoot suppression methods also degrade the overall enhancement quality by suppressing the enhancement in non-shoot areas. As a result, shoot artifacts are suppressed, but the resulting image is not much enhanced either. There is, therefore, a need for a shoot suppression method and apparatus that provides suppression only in shoot areas while maintaining good enhancement in non-shoot areas.

BRIEF SUMMARY OF THE INVENTION

The present invention addresses the above needs. An object of the present invention is to provide a shoot suppression method and system for image detail enhancement. Such method and system can be used with low pass filters of different lengths. Further such method and system provide needed shoot suppression in shoot areas while preserving the enhancement (with less or no suppression) in non-shoot areas.

As such, in one implementation, the present invention provides a shoot suppression method and system utilizing a symmetry checker and, optionally, an intensity checker. The symmetry checker checks the luminance variation of pixels neighboring the current image pixel within the filtering range. Based on the checking result, different patterns of luminance variation in the neighborhood of the current pixel can be categorized. Therefore, higher suppression can be assigned to those patterns that are more likely to cause overshoot/undershoot.

Further, optionally, the intensity checker checks the magnitude of a detail signal. If the detail signal is weak at a pixel position, it is unlikely that obvious shoot artifacts appear at that pixel position due to enhancement. As such, lower or no shoot suppression is applied. Therefore, shoot suppression can be associated with the intensity of detail signal at each pixel position.

Such a method and system provide shoot suppression only in shoot areas while maintaining good enhancement in non-shoot areas.

BRIEF DESCRIPTION OF THE DRAWINGS

These and other features, aspects and advantages of the present invention will become understood with reference to the following description, appended claims and accompanying figures where:

FIG. 3a shows the original image, and FIG. 3b shows the enhanced result;

DETAILED DESCRIPTION OF THE INVENTION

Figure 1:
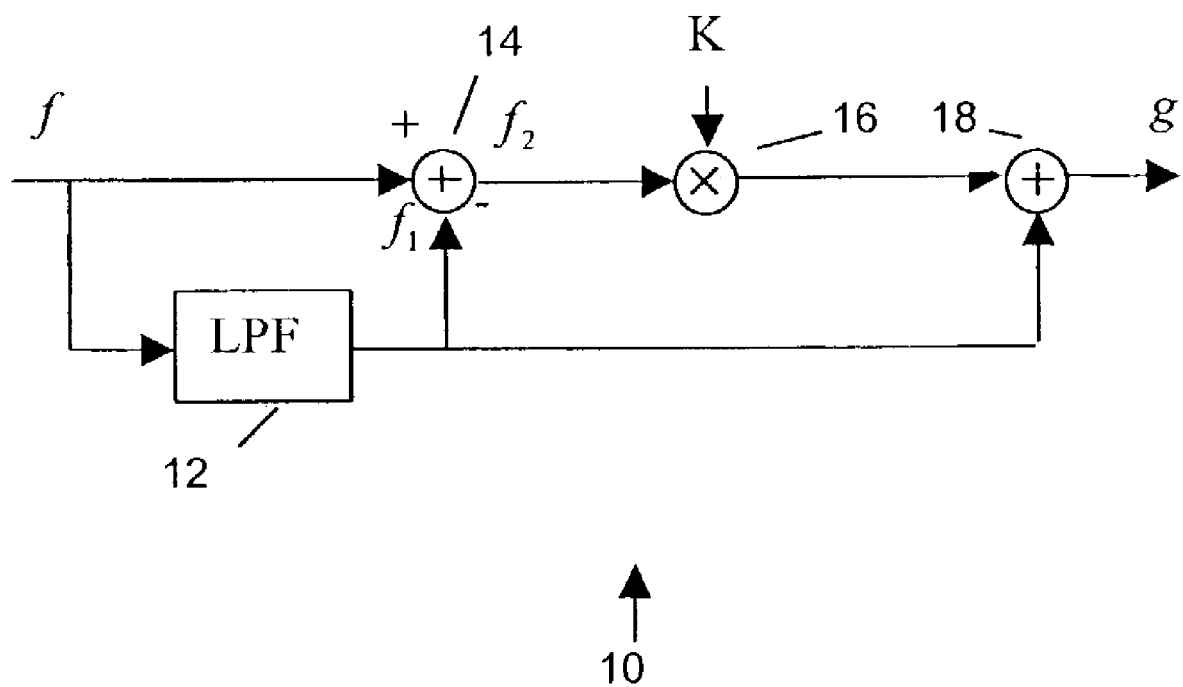
FIG. 1 shows a block diagram of a conventional detail enhancement system.
Figure 2:
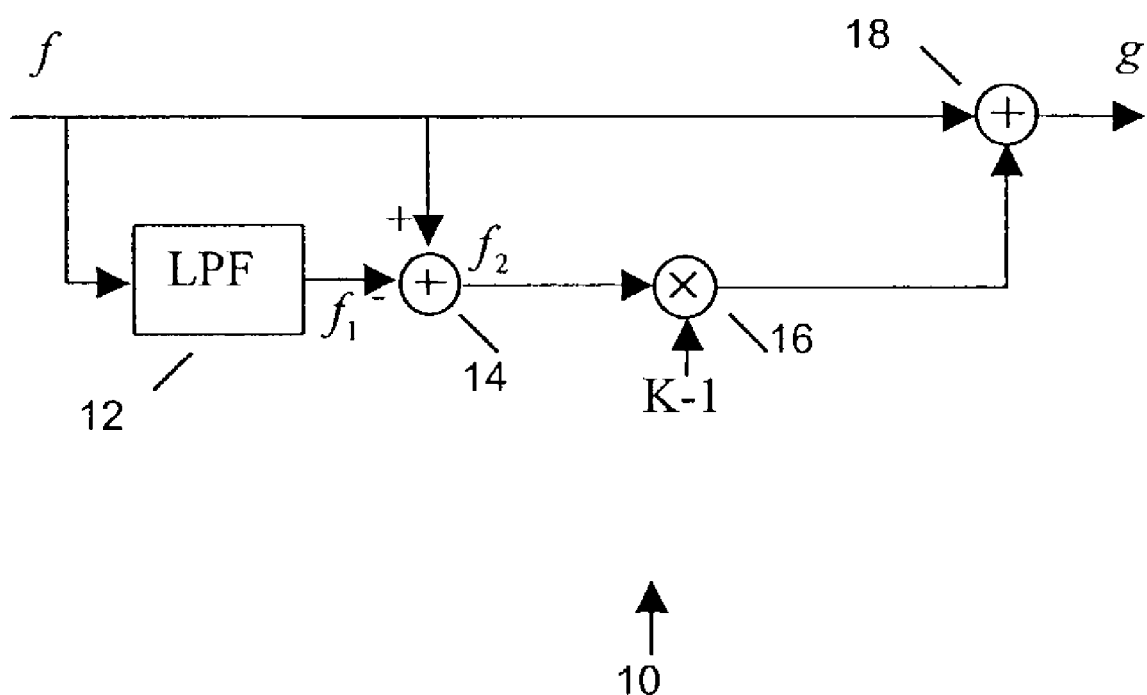
FIG. 2 shows a block diagram of a detail enhancement system, equivalent to that shown in FIG. 1.

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspects of the invention to the embodiments illustrated.

As noted above, the present invention provides a shoot suppression method and system for image detail enhancement. Such a method and system can be used with low pass filters (LPF) of different lengths. Utilizing a symmetry checker and, optionally, an intensity checker according to the present invention, necessary suppression in shoot areas is provided, while the enhancement (with less or no suppression) in non-shoot areas, is preserved.

The symmetry checker checks the luminance variation of pixels neighboring the current pixel within the filtering range. Based on the checking result, different patterns of luminance variation in the neighborhood of the current pixel can be categorized. Therefore, higher suppression can be assigned to those patterns that are more likely to cause overshoot/undershoot. Then, optionally, the intensity checker checks the magnitude of the detail signal (e.g., $(f-f_1)$ in FIG. 1). If the detail signal is weak at a pixel position, it is unlikely that obvious shoot artifacts appear at that pixel position. Therefore, suppression can be associated with the intensity of detail signal at each pixel position. A preferred implementation of the present invention is now described.

Preferred Embodiment

In image detail enhancement, shoot artifacts usually occur around edge areas. More specifically, the shoot artifacts usually occur around a sharp turning point of pixel luminance that is transitioning from a relatively smooth area. FIGS. 5a-5d show four example pixel luminance patterns that are typically most likely to generate shoot artifacts during detail enhancement. For illustration purpose, in each of FIGS. 5a-5d, characteristics of eight pixels are shown in each pattern. The number of pixels actually involved can be varied depending on the number of filter taps of the low pass filter (LPF) used in generating the aforementioned $f_1$ signal for the detail signal $f-f_1$. An example LPF filter used in this example can be a 5-tap, finite impulse response (FIR) filter. Other filters can also be used, as is known to those skilled in the art.

Figure 6:
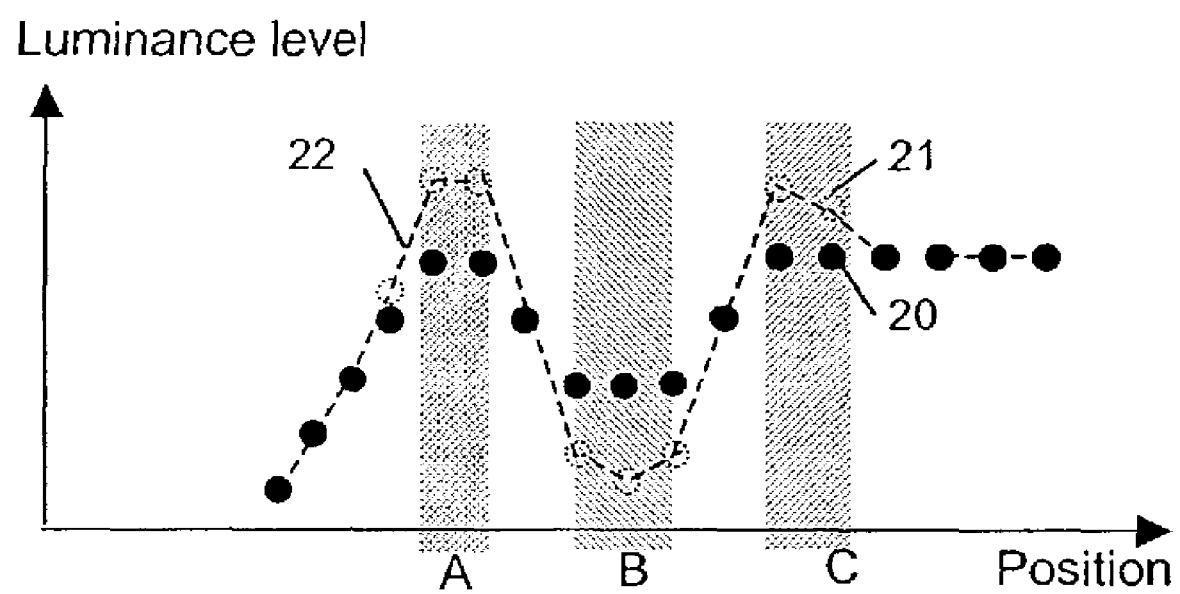
FIG. 6 shows an example of shoot artifacts versus normal enhanced details.

It can be seen that one commonality among the four patterns in FIGS. 5a-5d, is that they all contain a "transition" area and a large "flat" area in terms of pixel luminance level. For an illustration of the cause of shoot artifacts, the patterns shown in FIGS. 5a-d can be compared with other patterns, an example of which is represented in FIG. 6. In FIG. 6, solid circles 20 indicate the original pixel luminance levels. When the enhanced luminance value of a pixel is different from its original value, a hollow circle 21 is shown at the same position but at the enhanced luminance level. A curve 22, shown by broken lines, is obtained by connecting all the pixel values after enhancement.

From FIG. 6, it can be seen that the shaded regions A, B and C are all obviously enhanced. However, only regions A and B are desirable for enhancement. The enhancement in region C is not desirable. This is because, for regions A and B, after enhancement, bright areas (in region A) become brighter and dark areas (in region B) becomes darker. Thus, these details (i.e., the fine variations of the pixel luminance curve) become more visible. However, for region C, the enhancement creates a brighter section in a large flat area, which can be annoying when the enhancement is obvious. This is how shoot artifacts are generated and the reason why patterns in FIGS. 5a-5d are likely to generate these types of artifacts (the result in FIG. 3b is a real example of these shoot artifacts).

Therefore, an object of the present invention in processing image data is to essentially detect at least patterns represented by example in FIGS. 5a-5d, and within the filtering range, if the image pixel luminance curve is close to any pattern in FIGS. 5a-5d, then the enhancement at that pixel position is essentially suppressed.

Figure 7A:
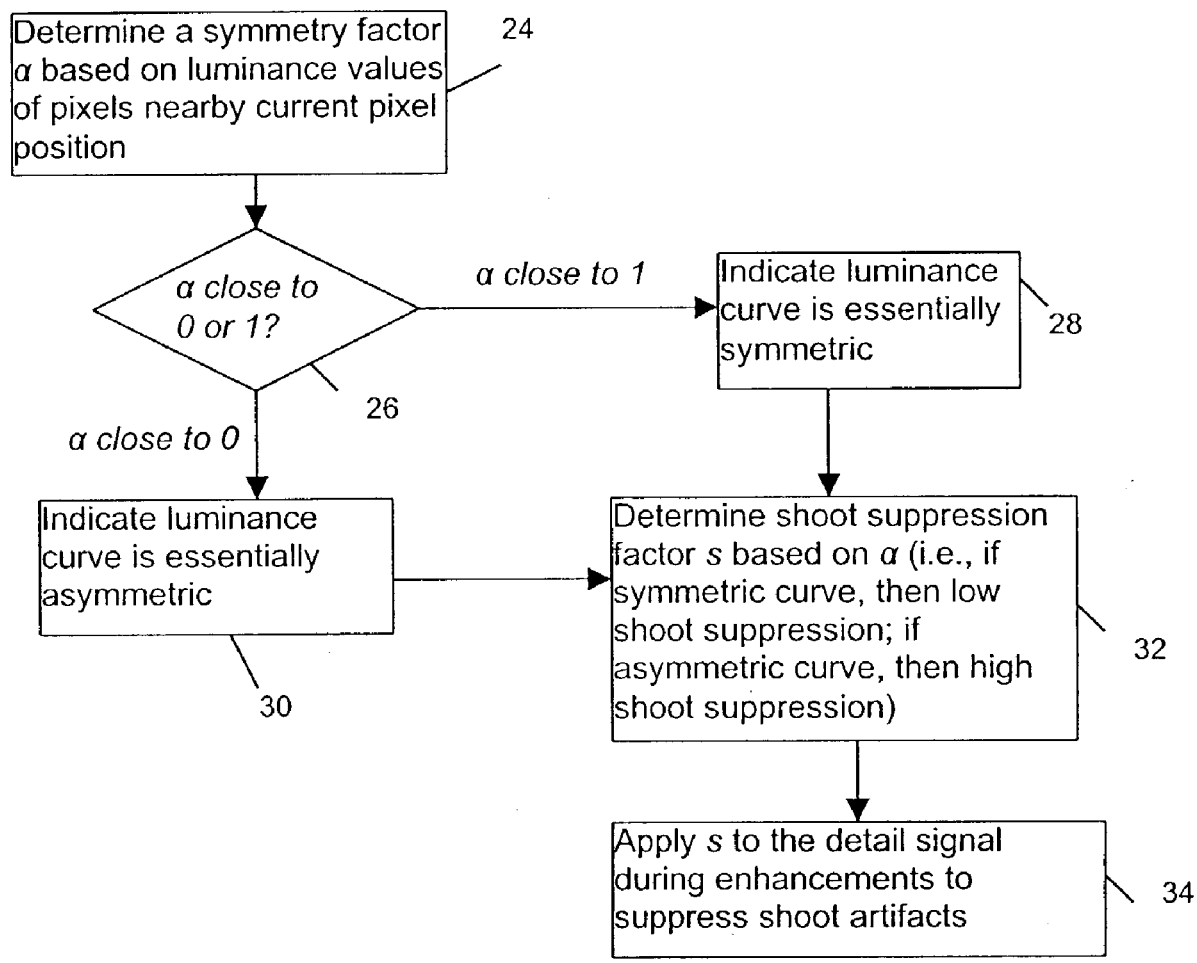
FIG. 7A shows a flowchart of steps in an embodiment of a method of-shoot suppression according to the present invention.

FIG. 7A shows example steps of an embodiment of a shoot suppression method in image detail enhancement according to the present invention. The example method includes the steps of: within the filtering range, calculating a symmetry factor α based on image characteristic (e.g., luminance) values of pixels nearby the current pixel (step 24); comparing α to upper and lower threshold values, such as e.g. 0 and 1, respectively (step 26), and when α is close to e.g. 1, indicating that the luminance curve of these pixels is essentially symmetric with reference to the current pixel position (step 28), and when α is close to e.g. 0, indicating that the luminance curve of these pixels is essentially not symmetric with reference to the current pixel position (step 30); then calculating a shoot suppression factor s based on the symmetry factor α (step 32), wherein for a symmetric luminance curve, little shoot suppression is needed and for a non-symmetric luminance curve, more shoot suppression is necessary; and then applying, or combining (e.g., multiplying), the shoot suppression factor s with the detail signal during enhancement to suppress shoot artifacts (step 34).

In the examples herein, although preferably luminance is used as an image pixel characteristic value, other characteristic values such as chrominance, etc., can also be used based on the application of the present invention.

Figure 7B:
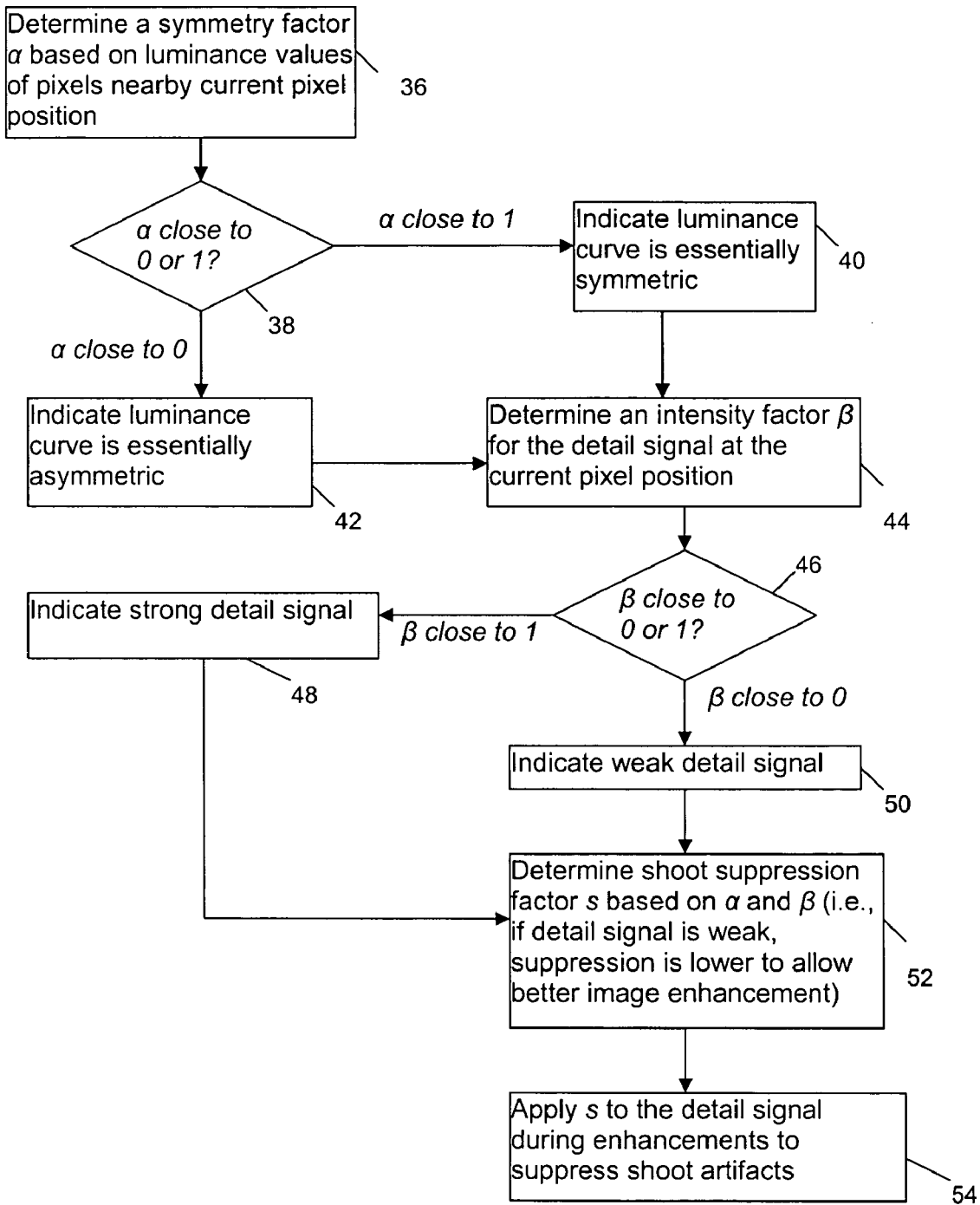
FIG. 7B shows a flowchart of steps in another embodiment of a method of shoot suppression according to the present invention.

FIG. 7B shows example steps of another embodiment of a shoot suppression method in image detail enhancement according to the present invention. The example method includes the steps of: within the filtering range, calculating a symmetry factor α based on image characteristic (e.g., luminance) values of pixels nearby the current pixel (step 36); comparing α to threshold values such as e.g. 0 to 1 (step 38), and when α is close to e.g. 1, indicating that the luminance curve of these pixels is close to being symmetric with reference to the current pixel position (step 40), and when α is close to e.g. 0, indicating that the luminance curve of these pixels is essentially asymmetric with reference to the current pixel position (step 42); determining an intensity factor β, for the detail signal at the current pixel position (step 44); comparing β to threshold values such as e.g. 0 to 1 (step 46), and when β is close to e.g. 1, indicating that the detail signal is strong (step 48), and when β is close to e.g. 0, indicating that the detail signal is weak (step 50); then calculating a shoot suppression factor s based on the symmetry factor α and the intensity factor β (step 52), wherein e.g. if detail signal is weak, suppression is lower to allow better image enhancement; and then applying, or combining (e.g., multiplying) the shoot suppression factor s with, the detail signal during enhancement to suppress shoot artifacts (step 54).

Figure 4:
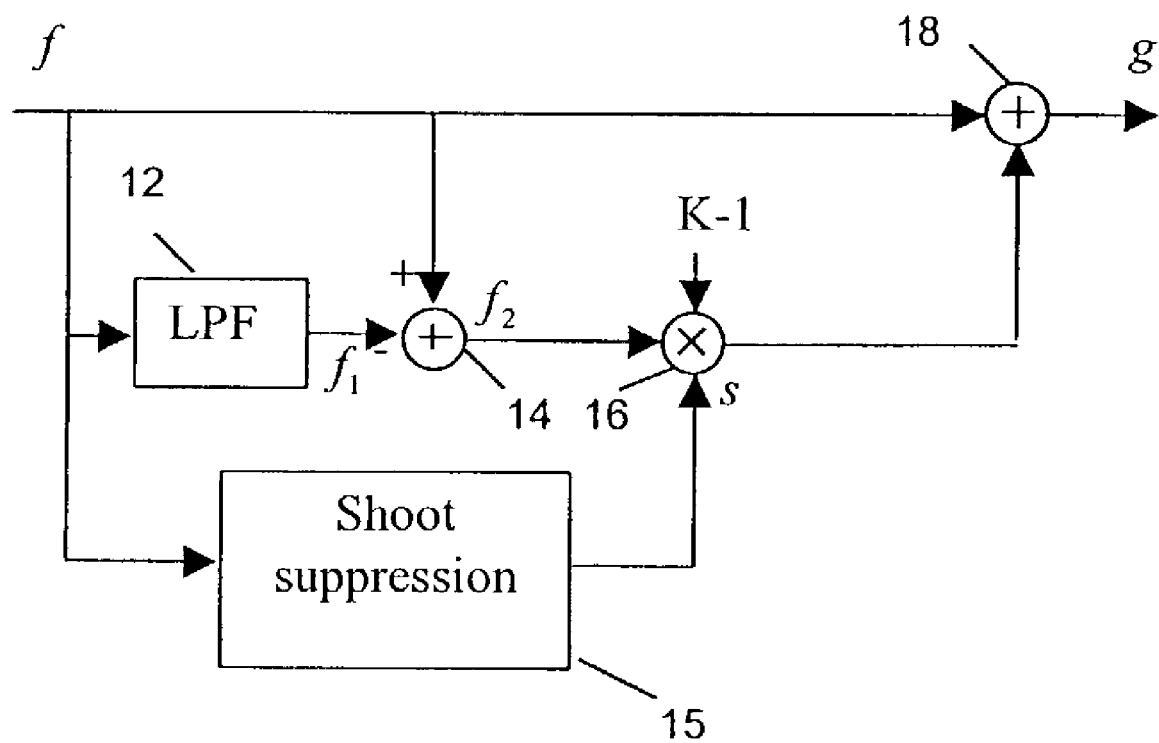
FIG. 4 shows a block diagram of a detail enhancement system in which the present invention can be implemented.
Figure 5A:
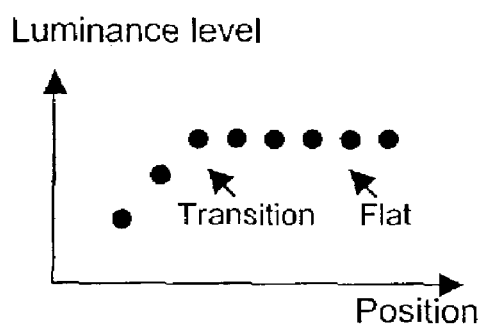
FIGS. 5a-5d show four typical pixel luminance patterns that are likely to generate shoot artifacts in image detail enhancement.
Figure 5B:
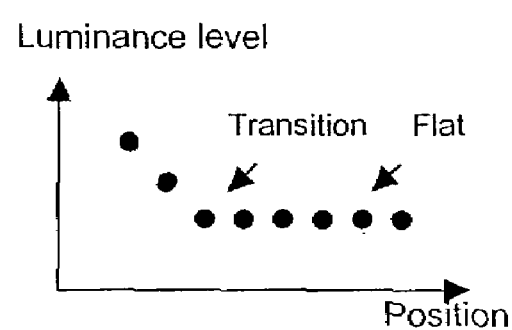
Figure 5C:
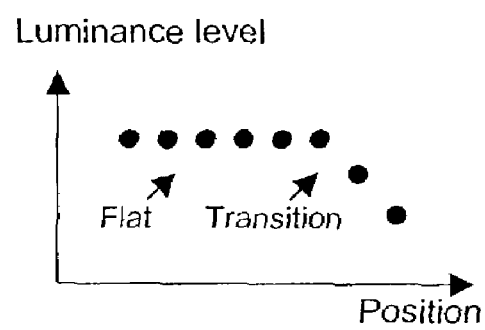
Figure 5D:
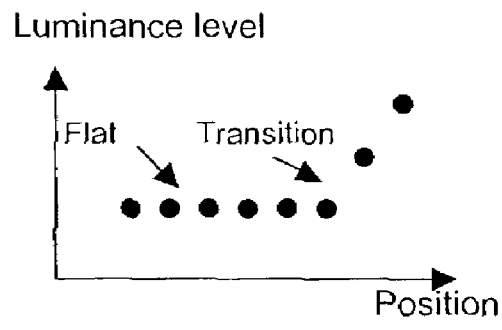
Figure 8A:
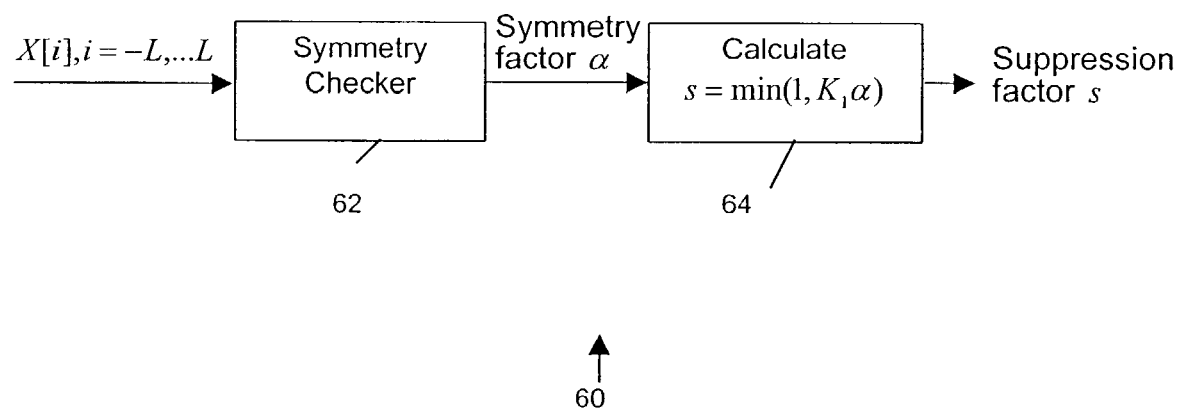
FIG. 8A shows a block diagram of an embodiment of a shoot suppression system according to the present invention.

FIG. 8A shows a block diagram of an embodiment of a shoot suppression system (shoot suppressor) 60 according to the present invention, which can be utilized in place of the conventional shoot suppression block 15 in an enhancement system such as shown in FIG. 4. In FIG. 8A, the shoot suppressor 60 includes a symmetry checker 62 and a calculation block 64. The symmetry checker 62 is used to check the luminance variation of pixels neighboring the current image pixel within the filtering range. A symmetry factor α ($0 \leq \alpha \leq 1$) is determined based on the pattern of luminance variation in pixels in the neighborhood of the current pixel. The symmetry factor α is then used by the calculation block 64 to obtain a suppression factor s. In this example, when α is closer to 1, then the luminance pattern of said pixels in the neighborhood of the current pixel, is closer to a symmetric pattern. As such, less suppression is needed. When α is closer to 0, the luminance pattern of the pixels in the neighborhood of the current pixel is similar to one of the patterns shown in FIGS. 5a-5d (i.e., not symmetric), wherein more suppression is needed.

For simplicity, the following description assumes that the data to be enhanced is in one dimension. However, the present invention is equally applicable to two dimensional data as well with data being processed along each dimension separately.

The one dimensional signal data input is represented by $X[i]$, $i = -L, \ldots, -1, 0, 1, \ldots, L$, wherein $X[0]$ is the current pixel to be enhanced, and L is a constant such that the value $(2 \ast L + 1)$ is the length of the aforementioned LPF (or the number of filter taps of the LPF). Therefore, $X[i]$, $i = -L, \ldots, -1, 0, 1, \ldots, L$ are all the pixels involved in filtering when pixel $X[0]$ is being enhanced.

In order to check the symmetry of pixel luminance curve with reference to the position of $X[0]$, the following two values are first determined by the symmetry checker 62:

$$M_l = \max(d_{0,-L}, d_{0,-L+1}, \ldots, d_{0,-1}) \quad (4)$$

$$M_r = \max(d_{L,0}, d_{L-1,0}, \ldots, d_{1,0}) \quad (5)$$

wherein the function $\max(p_1, p_2, \ldots)$ returns the maximum value from the input parameters, and $d_{m,n}$ represents the absolute difference between pixels $X[m]$ and $X[n]$, as:

$$d_{m,n} = |X[m] - X[n]| \quad (6)$$

As such, $M_l$ is the maximum absolute luminance difference between $X[0]$ and any pixel on its left side within the filtering range. Likewise, $M_r$ is the maximum absolute luminance difference between $X[0]$ and any pixel on its right side within the filtering range.

If both $M_l$ and $M_r$ are equal to zero, then $X[i]$, $i = -L, \ldots, -1, 0, 1, \ldots, L$ all have the same value, wherein no suppression is necessary because the detail signal $(f-f_1)$ is zero. This is a special case in which the symmetry factor α can be set to any value between 0 and 1 (e.g., α is set to 0 for this case).

If one, and only one, of $M_l$ and $M_r$ is equal to zero, the pixel luminance pattern of $X[i]$ is close to one of those shown in FIGS. 5a-5d. Therefore, it is very likely for shoot artifacts to appear at such a position. As such, α is set to 0 for this case, indicating that maximum suppression is applied.

If neither of $M_l$ and $M_r$ is equal to zero, then two more values are calculated as:

$$A_l = \frac{1}{L} \sum_{i=0}^{L-1} d_{0,-L+i} \quad (7)$$

$$A_r = \frac{1}{L} \sum_{i=0}^{L-1} d_{L-i,0} \quad (8)$$

wherein $A_l$ is the average of the absolute luminance difference values on the left side of $X[0]$, and $A_r$ is the average of the absolute luminance difference values on the right side of $X[0]$.

The symmetry factor α can then be determined as:

$$\alpha = \min(A_l / M_r, A_r / M_l) \quad (9)$$

wherein the function $\min(p_1, p_2, \ldots)$ returns the minimum value from the input parameters.

As such, the symmetry factor α at a given pixel position is calculated according to the following equation:

$$\alpha = \begin{cases} 0 & \text{if } M_r \ast M_l = 0 \\ \min(A_l / M_r, A_r / M_l) & \text{otherwise} \end{cases} \quad (10)$$

wherein $M_l$ is the maximum absolute luminance difference between the current pixel and any pixel on its left side within the filtering range, $M_r$ is the maximum absolute luminance difference between the current pixel and any pixel on its right side within the filtering range, $A_l$ is the average of the absolute difference values on the left side of the current pixel and $A_r$ is the average of the absolute difference values on the right side of the current pixel.

Based on the symmetry factor α, the suppression factor s is determined by the calculation block 64 according to the following example relation:

$$s = \min(1, K_1 \alpha) \quad (11)$$

wherein $K_1$ is a constant ($K_1 \geq 1$).

Figure 9:
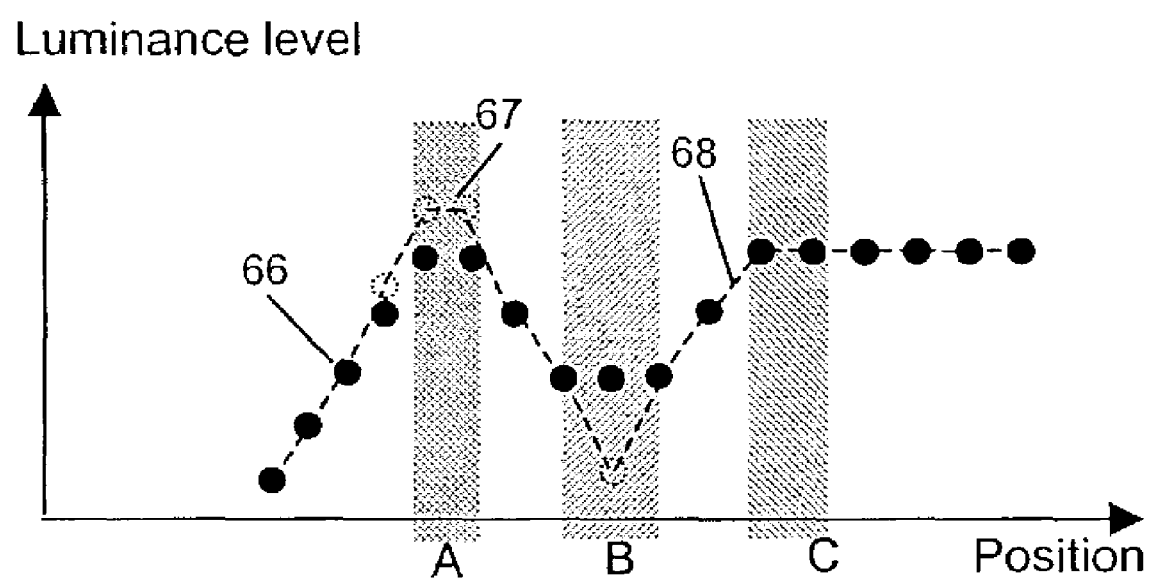
FIG. 9 shows the enhancement result for the example of FIG. 6 using a shoot suppression system according to the present invention.

According to relations (10) and (11) above, essentially all the pixel positions in region C shown in FIG. 6 have a suppression factor zero, indicating that maximum suppression is applied and shoot artifacts can, therefore, be suppressed at those pixel positions. However, for the pixel positions in regions A and B shown in FIG. 6, suppression factors are not all zero. Still, assuming that the LPF is a 5 tap FIR filter, and $K_1 = 2$, with shoot suppression according to the present invention, the enhancement result of the pixels in FIG. 6 is shown in FIG. 9. In the example of FIG. 9, solid circles 66 indicate the original pixel luminance levels. When the enhanced luminance value of a pixel is different from its original value, a hollow circle 67 is shown at the same position but at the enhanced luminance level. A curve 68, shown by broken lines is obtained by connecting all the pixel values after enhancement. From the result in FIG. 9, it can be seen that shoot artifacts in region C are completely suppressed, while details in region A and B are effectively enhanced.

Figure 3A:
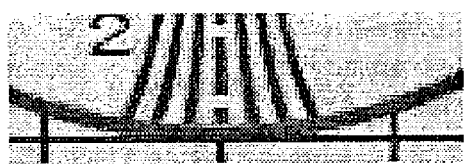
FIGS. 3a-b show results of image detail enhancement without shoot suppression, where
Figure 3B:
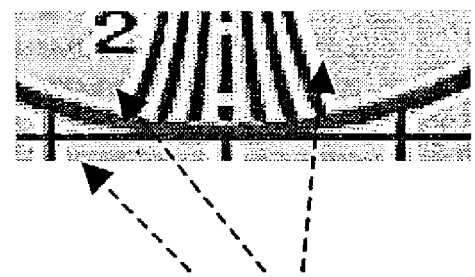
Figure 10A:
FIG. 10a shows a copy of an original image of FIG. 3A without shoot suppression according to the preferred method of the present invention.
Figure 10B:
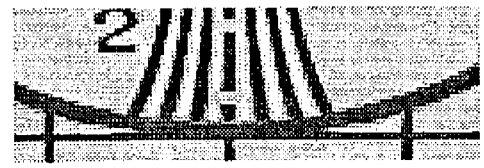
FIG. 10b shows a further result of image detail enhancement for FIG. 10a with shoot suppression according to the preferred method of the present invention.

FIGS. 10a-10b, show application of the shoot suppression method in enhancement of the example image in FIG. 3a. FIG. 10a shows the original image and FIG. 10b shows the enhanced image with shoot suppression according to the present invention. Comparing FIG. 10b with the result in FIG. 3b, the results obtained by the method of the present invention have no obvious shoot artifacts, while details are still well enhanced.

Figure 8B:
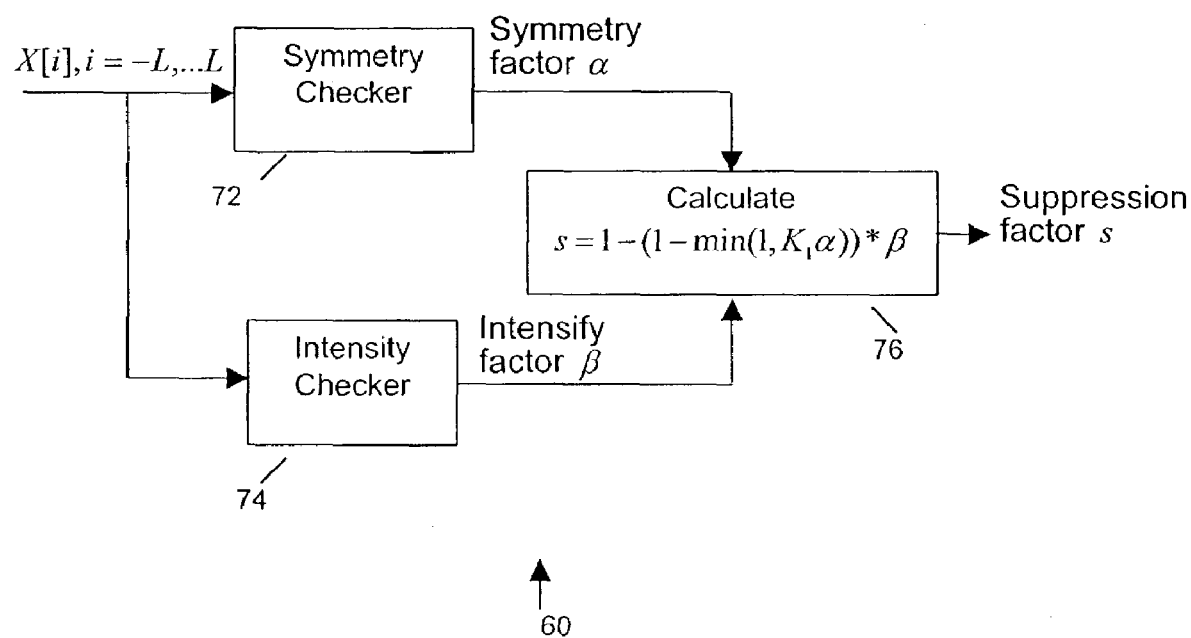
FIG. 8B shows a block diagram of another embodiment of a shoot suppression system according to the present invention.

FIG. 8B shows a block diagram of another embodiment of the shoot suppression system 60 according to present invention. In this embodiment, the shoot suppressor 60 includes a symmetry checker 72, an intensity checker 74 and a calculation block 76. The shoot suppressor 60 can be utilized in place of the conventional shoot suppression block 15 in an enhancement system such as shown in FIG. 4. The symmetry checker 72 operates in a similar fashion as the symmetry checker 62 of FIG. 8A. The intensity checker 76 checks the magnitude of the detail signal $(f-f_1)$ at a current pixel position. When the detail signal is weak, shoot suppression for that pixel position may be less or not applied, so to allow a better enhancement at such a position. This is because, if the detail signal is weak, it is unlikely for obvious shoot artifacts to be introduced at that pixel position. Therefore, shoot suppression may not be necessary for that pixel position. The purpose of associating shoot suppression factor with the detail signal intensity is to allow better enhancement at places where detail signal is weak.

As such, a detail signal is first determined in the intensity checker 74. Assuming the coefficients of LPF are $C_i$, $i=-L, \ldots L$, then $C(0)$ is the center tap of the LPF filter. Then a detail signal at the current pixel location can be expressed as:

$$dd = X[0] - \sum_{i=-L}^{L} C_i X[i] = \sum_{i=-L}^{L} D_i X[i] \quad (12)$$

wherein $D_i$, $i=-L, \ldots L$ can be considered as the coefficients of a high pass filter (HPF). The relationship between $D_i$ and $C_i$ can be expressed as:

$$D_i = \begin{cases} 1 - C_i & \text{for } i = 0 \\ C_i & \text{otherwise} \end{cases} \quad (13)$$

After the detail signal is obtained, it is utilized to determine an intensity factor $\beta$. If the value of $\beta$ is close to e.g. 0, it means that the detail signal at current location is considered weak. If the value of $\beta$ is close to e.g. 1, it means that the detail signal at current location is considered strong. In one example, the detail signal is used in conjunction with a pair of predetermined threshold values $T_1$ and $T_2$ ($0 \leq T_1 < T_2$) to determine the intensity factor $\beta$ in the intensity checker 74, according to the relation:

$$\beta = \min(1, \max(0, (|dd|-T_1)/(T_2-T_1))) \quad (14)$$

wherein $0 \leq \beta \leq 1$.

The values of $T_1$ and $T_2$ are chosen such that when the detail signal is considered weak according to relation (14), essentially no obvious shoot artifacts are introduced during enhancement. The larger $\beta$ is, the stronger the detail signal is. Using both the symmetry factor $\alpha$ and the intensity factor $\beta$, the suppression factor s is determined by the calculation block 76, as:

$$s = 1 - (1 - \min(1, K_1 \alpha)) * \beta. \quad (15)$$

When $\beta = 1$, the detail signal is strong and equation (15) is equivalent to equation (11). Therefore, shoot suppression is performed as usual. When $\beta = 0$, the detail signal is considered very weak and suppression factor s takes a value of e.g. 1 according to equation (15), indicating that no suppression is applied.

Figure 8C:
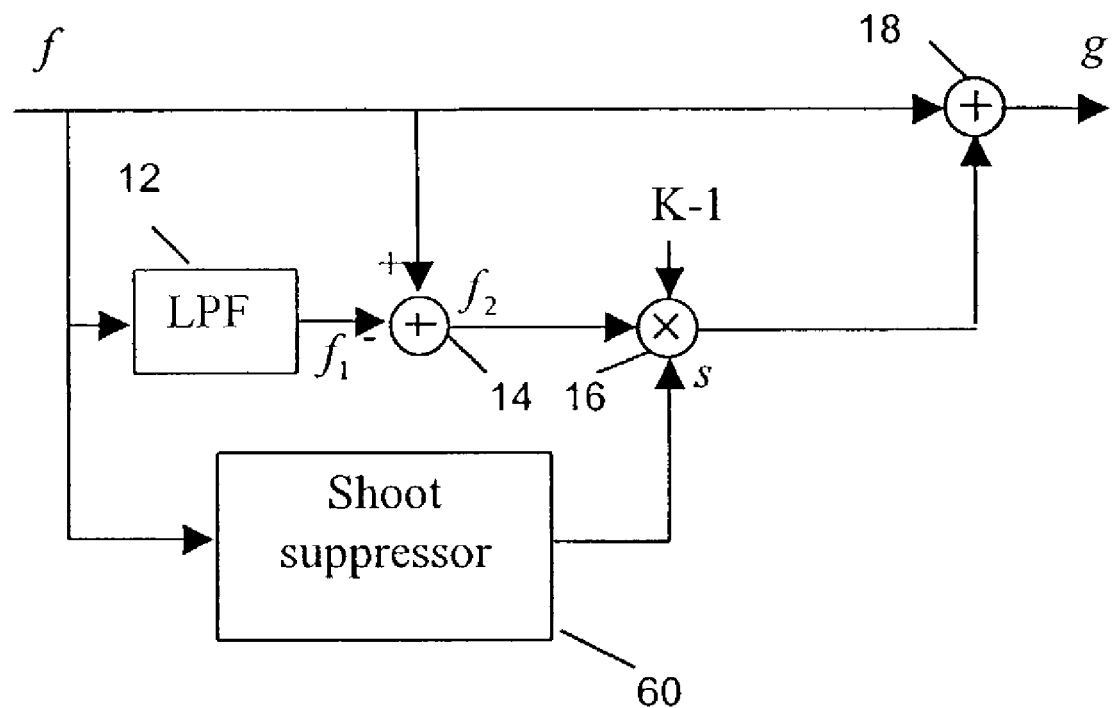
FIG. 8C shows a block diagram of a detail enhancement system including a shoot suppression system, according to the present invention.

As shown in FIG. 8C, in an example shoot suppression system 70 according to the present invention, output of the shoot suppressor 60 is then applied to the difference signal $f_2 = (f - f_1)$, using enhancement factor $(K-1)$ at e.g. a multiplication junction 16, and the result is combined with the input signal f at the e.g. summing junction 18, to generate the detail-enhanced output signal g, wherein, in this example:

$$g = (f-f_1) * (K-1) * s + f. \quad (16)$$

Elements 16 and/or 18 may form a combiner.

Accordingly, in the example shoot suppression system 60, the suppression factor is determined by checking the luminance pattern of neighboring pixels around the current pixel within the filtering range, and by optionally checking the intensity of detail signal. The symmetry checker calculates the maximum absolute luminance difference values and average absolute luminance difference values between the current pixel and nearby pixels (e.g., pixels on its left and on its right, respectively). Based on these maximum and average absolute difference values, the value of the symmetry factor $\alpha$ is determined., wherein $\alpha$ indicates how symmetric the luminance curve of neighboring pixels is with reference to the current pixel. The symmetry factor can then be used to obtain the value of the shoot suppression factor.

The optional intensity checker, checks the intensity of the detail signal at the current pixel position/location. When the intensity checker is available, the intensity factor $\beta$ is calculated and used together with the symmetry factor $\alpha$ in determining the value of the shoot suppression factor s. The value of $\beta$ indicates how strong the detail signal is at the current pixel location. As noted above, when the detail signal is weak, shoot suppression for that position may be less or not applied so to allow a better enhancement at such a position.

The aforementioned apparatus/system according to the present invention, can be implemented as program instructions for execution by a processor, as logic circuits, as ASIC, as firmware, etc., as is known to those skilled in the art. Therefore, the present invention is not limited to the example embodiments described herein.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method for shoot suppression in image detail enhancement, comprising the steps of:
    (a) selecting image details for enhancement, wherein the selected image details are represented by a detail signal that is a function of an image signal f and a filtered version of the image signal f;
    (b) determining a shoot suppression factor s for the detail signal at each pixel position based on the image characteristics of the pixels neighboring a current image pixel in order to substantially suppress shoot artifacts in the enhanced image details; and (c) applying the shoot suppression factor s to the detail signal, wherein step (b) further includes the steps of:

determining a symmetry factor α based on luminance values of pixels neighboring a current image pixel, wherein the symmetry factor represents amount of symmetry in the luminance curve of the neighboring pixels with reference to the current pixel position, and determining the shoot suppression factor s based on the symmetry factor α, wherein:

for an essentially symmetric luminance curve, lower shoot suppression is selected, and for an essentially asymmetric luminance curve, higher shoot suppression is selected.

2. The method of claim 1, wherein:

the symmetry factor α at a pixel position is determined as:

$$\alpha = \begin{cases} 0, & \text{if } M_r * M_l = 0 \\ \min(A_l/M_r, A_r/M_l), & \text{otherwise,} \end{cases}$$

such that $M_l$ is the maximum absolute luminance difference between the current pixel and any pixel on its left side, $M_r$ is the maximum absolute luminance difference between the current pixel and any pixel on its right side, $A_l$ is the average of the absolute luminance difference values on the left side of the current pixel, $A_r$ is the average of the absolute luminance difference values on the right side of the current pixel.

3. The method of claim 2, wherein:

the detail signal is a function of the difference between an image signal f representing the image, and a filtered signal $f_1$ representing the signal f after application of a low pass filter, such that signal $f_1$ at each pixel position is determined based on pixels of signal f within the filtering range, represented by a one dimensional sequence of pixels centered with current pixels, wherein samples of signal f are represented by X[i], i=−L, . . . ,−1,0,1, . . . , L, such that X[0] is the current pixel to be enhanced, L is a constant where the value (2*L+1) is the length of the filter, and X[i], i=−L, . . . , −1,0,1, . . . , L are essentially all the pixels involved in filtering when X[0] is being enhanced; and $M_l = \max(d_{0,-L}, d_{0,-L+1}, d_{0,-1})$, $M_r = \max(d_{L,0}, d_{L-1,0}, \ldots, d_{1,0})$, $$A_l = \frac{1}{L}\sum_{i=0}^{L-1} d_{0,-L+i},$$

$$A_r = \frac{1}{L}\sum_{i=0}^{L-1} d_{L-i,0},$$

wherein $d_{m,n}$ denotes the absolute luminance difference between pixel X[m] at position m and pixel X[n] at position n, such that:

$d_{m,n} = |X[m] - X[n]|$.

4. The method of claim 1, wherein the shoot suppression factors at a pixel position is represented by:

$s = \min(1, K_1\alpha)$, wherein $K_1$ is a constant, $K_1 \geq 1$.

5. A method for enhancing image details in an image signal f, comprising the steps of:

(a) generating a detail signal $f_2$ as a function of the difference between the image signal f and a filtered version of the image signal f, the detail signal $f_2$ representing the image details;

(b) determining a shoot suppression factor s for the detail signal $f_2$ at each pixel position based on the image characteristics of the pixels neighboring a current pixel, in order to substantially suppress shoot artifacts in the enhanced image details; and (c) applying the shoot suppression factor s to the detail signal $f_2$, wherein step (b) further includes the steps of:

determining a symmetry factor α based on luminance values of pixels neighboring a current image pixel, wherein the symmetry factor represents amount of symmetry in the luminance curve of the neighboring pixels with reference to the current pixel position, and determining the shoot suppression factor s based on the symmetry factor α, wherein:

for an essentially symmetric luminance curve, lower shoot suppression is selected, and for an essentially asymmetric luminance curve, higher shoot suppression is selected.

6. The method of claim 5, wherein:

the symmetry factor α at a pixel position is determined as:

$$\alpha = \begin{cases} 0, & \text{if } M_r * M_l = 0 \\ \min(A_l/M_r, A_r/M_l), & \text{otherwise,} \end{cases}$$

such that $M_l$ is the maximum absolute luminance difference between the current pixel and any pixel on its left side, $M_r$ is the maximum absolute luminance difference between the current pixel and any pixel on its right side, $A_l$ is the average of the absolute luminance difference values on the left side of the current pixel, $A_r$ is the average of the absolute luminance difference values on the right side of the current pixel.

7. The method of claim 6, wherein:

the detail signal is a function of the difference between an image signal f representing the image, and a filtered signal $f_1$ representing the signal f after application of a low pass filter, such that signal $f_1$ at each pixel position is determined based on pixels of signal f within the filtering range, represented by a one dimensional sequence of pixels centered with current pixels, wherein samples of signal f are represented by X[i], i=−L, . . . ,−1,0,1, . . . , L, such that X[0] is the current pixel to be enhanced, L is a constant where the value (2*L+1) is the length of the filter, and X[i], i=−L, . . . ,−1,0,1, . . . , L are essentially all the pixels involved in filtering when X[0] is being enhanced; and $M_l = \max(d_{0,-L}, d_{0,-L+1}, \ldots, d_{0,-1})$, $M_r = \max(d_{L,0}, d_{L-1,0}, \ldots, d_{1,0})$, $$A_l = \frac{1}{L}\sum_{i=0}^{L-1} d_{0,-L+i},$$

-continued $$A_r = \frac{1}{L}\sum_{i=0}^{L-1} d_{L-i,0},$$

wherein $d_{m,n}$ denotes the absolute luminance difference between pixel X[m] at position m and pixel X[n] at position n, such that:

$d_{m,n} = |X[m] - X[n]|$.

8. The method of claim 5, wherein the shoot suppression factor s at a pixel position is represented by:

$s = \min(1, K_1\alpha)$, wherein $K_1$ is a constant, $K_1 \geq 1$.

9. An apparatus for shoot suppression in image detail enhancement, wherein selected image details are represented by a detail signal, comprising:
a shoot suppressor that determines a shoot suppression factor s for the detail signal based on the image characteristics of the pixels neighboring a current pixel in order to substantially suppress shoot artifacts in the enhanced image details; and
a combiner that applies the shoot suppression factor s to the detail signal, wherein
the shoot suppressor comprises:
a symmetry checker for determining a symmetry factor α based on luminance values of pixels neighboring a current image pixel, wherein the symmetry factor represents amount of symmetry in the luminance curve of the neighboring pixels with reference to the current pixel position,
such that the shoot suppressor determines the shoot suppression factor s based on the symmetry factor α, wherein:
for an essentially symmetric luminance curve, lower shoot suppression is selected, and
for an essentially asymmetric luminance curve, higher shoot suppression is selected. wherein:
the symmetry checker determines the symmetry factor α at a pixel position according to the relation:

$$\alpha = \begin{cases} 0, & \text{if } M_r * M_l = 0 \\ \min(A_l/M_r, A_r/M_l), & \text{otherwise,} \end{cases}$$

wherein $M_l$ is the maximum absolute luminance difference between the current pixel and any pixel on its left side, $M_r$ is the maximum absolute luminance difference between the current pixel and any pixel on its right side, $A_l$ is the average of the absolute luminance difference values on the left side of the current pixel, $A_r$ is the average of the absolute luminance difference values on the right side of the current pixel.

10. The apparatus of claim 9, wherein:
the detail signal is a function of the difference between an image signal f representing the image, and a filtered signal $f_1$ representing the signal f after application of a low pass filter, such that signal $f_1$ at each pixel position is determined based on pixels of signal f within the filtering range, represented by a one dimensional sequence of pixels centered with current pixels, wherein samples of signal f are represented by X[i], i=−L, . . . ,−1,0,1, . . . , L, such that X[0] is the current pixel to be enhanced, L is a constant where the value (2*L+1) is the length of the filter, and X[i], i=−L, . . . ,−1,0,1, . . . , L are essentially all the pixels involved in filtering when X[0] is being enhanced; and $M_l = \max(d_{0,-L}, d_{0,-L+1}, \ldots, d_{0,-1})$, $M_r = \max(d_{L,0}, d_{L-1,0}, \ldots, d_{1,0})$, $$A_l = \frac{1}{L}\sum_{i=0}^{L-1} d_{0,-L+i},$$

$$A_r = \frac{1}{L}\sum_{i=0}^{L-1} d_{L-i,0},$$

wherein $d_{m,n}$ denotes the absolute luminance difference between pixel X[m] at position m and pixel X[n] at position n, such that:

$d_{m,n} = |X[m] - X[n]|$.

11. An apparatus for shoot suppression in image detail enhancement, wherein selected image details are represented by a detail signal, comprising:
a shoot suppressor that determines a shoot suppression factor s for the detail signal based on the image characteristics of the pixels neighboring a current pixel in order to substantially suppress shoot artifacts in the enhanced image details; and
a combiner that applies the shoot suppression factor s to the detail signal, wherein
the shoot suppressor comprises:
a symmetry checker for determining a symmetry factor α based on luminance values of pixels neighboring a current image pixel, wherein the symmetry factor represents amount of symmetry in the luminance curve of the neighboring pixels with reference to the current pixel position,
such that the shoot suppressor determines the shoot suppression factor s based on the symmetry factor α, wherein:
for an essentially symmetric luminance curve, lower shoot suppression is selected, and
for an essentially asymmetric luminance curve, higher shoot suppression is selected,
wherein the shoot suppressor determines the shoot suppression factor s at a pixel position by:
determining a product of the symmetry factor α and a constant $K_1$, wherein $K_1 \geq 1$; and
selecting the shoot suppression factor s as the minimum among the integer 1 and the product $K_1\alpha$.

12. An image enhancement apparatus for enhancing image details in an image signal f, comprising:
(a) a detail signal generator for generating a detail signal $f_2$ as a function of the image signal f and a filtered version of the image signal f, the detail signal $f_2$ representing the image details;
(b) a shoot suppressor that determines a shoot suppression factor s for the detail signal $f_2$ based on the image characteristics of the image details, in order to substantially suppress shoot artifacts in the enhanced image details; and
(c) a combiner that applies the shoot suppression factor s to the detail signal $f_2$, wherein:
the shoot suppressor includes a symmetry checker that determines a symmetry factor α based on luminance values of pixels neighboring a current image pixel, wherein the symmetry factor represents amount of symmetry in the luminance curve of the neighboring pixels with reference to the current pixel position, and the shoot suppressor determines the suppression factor s based on the symmetry factor α, wherein:

for an essentially symmetric luminance curve, lower shoot suppression is selected, and for an essentially asymmetric luminance curve, higher shoot suppression is selected.

13. The apparatus of claim 12, wherein:

the symmetry checker determined the symmetry factor α at a pixel position according to the relation:

$$\alpha = \begin{cases} 0, & \text{if } M_r * M_l = 0 \\ \min(A_l/M_r, A_r/M_l), & \text{otherwise,} \end{cases}$$

wherein $M_l$ is the maximum absolute luminance difference between the current pixel and any pixel on its left side, $M_r$ is the maximum absolute luminance difference between the current pixel and any pixel on its right side, $A_l$ is the average of the absolute luminance difference values on the left side of the current pixel, $A_r$ is the average of the absolute luminance difference values on the right side of the current pixel.

14. The apparatus of claim 13, wherein:

the detail signal is a function of the difference between an image signal f representing the image, and a filtered signal $f_1$ representing the signal f after application of a low pass filter, such that signal $f_1$ at each pixel position is determined based on pixels of signal f within the filtering range, represented by a one dimensional sequence of pixels centered with current pixels, wherein samples of signal f are represented by X[i], i=−L, . . . ,−1,0,1, . . . , L, such that X[0] is the current pixel to be enhanced, L is a constant where the value (2*L+1) is the length of the filter, and X[i], i=−L, . . . ,−1,0,1, . . . , L are essentially all the pixels involved in filtering when X[0] is being enhanced; and $M_l = \max(d_{0,-L}, d_{0,-L+1}, \ldots, d_{0,-1})$, $M_r = \max(d_{L,0}, d_{L-1,0}, d_{1,0})$, $$A_l = \frac{1}{L}\sum_{i=0}^{L-1} d_{0,-L+i},$$

$$A_r = \frac{1}{L}\sum_{i=0}^{L-1} d_{L-i,0},$$

wherein $d_{m,n}$ denotes the absolute luminance difference between pixel X[m] at position m and pixel X[n] at position n, such that:

$d_{m,n} = |X[m] - X[n]|$.

15. The apparatus of claim 12, wherein the shoot suppressor determined the shoot suppression factor s at a pixel position according to the relation:

$s = \min(1, K_1\alpha)$, wherein $K_1$ is a constant, $K_1 \geq 1$.

* * * * *